Nov. 11, 1969  J. E. KRYNSKI ET AL  3,477,583
HORIZONTAL TRAVELLING BELT FILTER
Filed July 21, 1967  4 Sheets-Sheet 1

INVENTORS
JOHN E. KRYNSKI
RICHARD E. ENGWALL
BY
Smythe & Moore
ATTORNEYS

INVENTORS
JOHN E. KRYNSKI
RICHARD E. ENGWALL
BY
ATTORNEYS

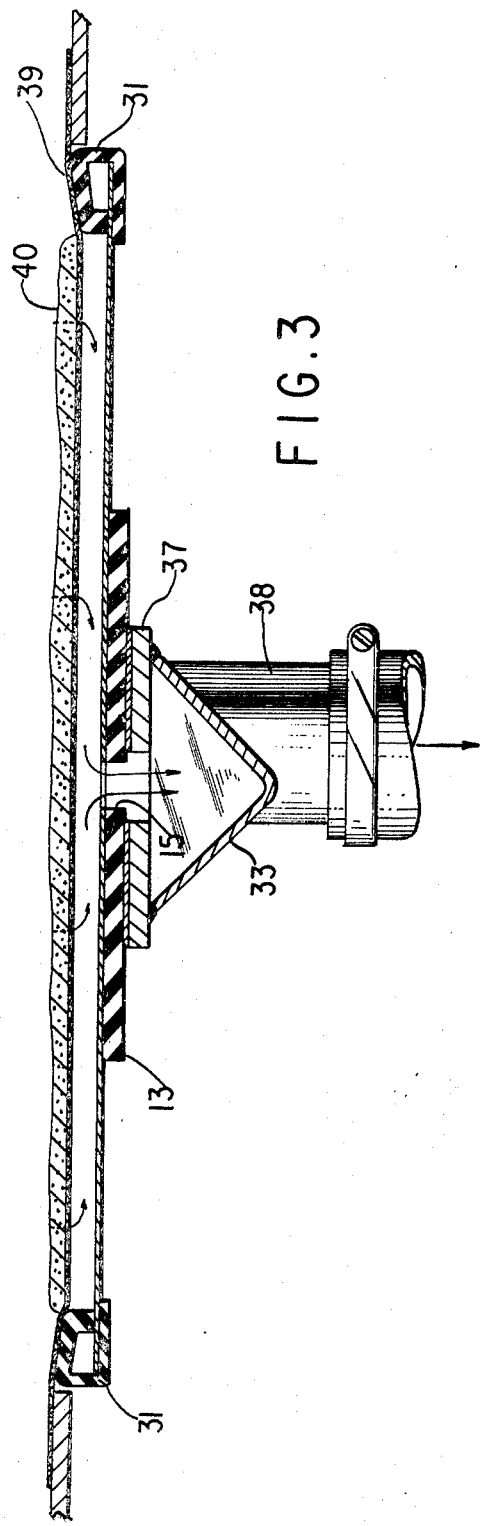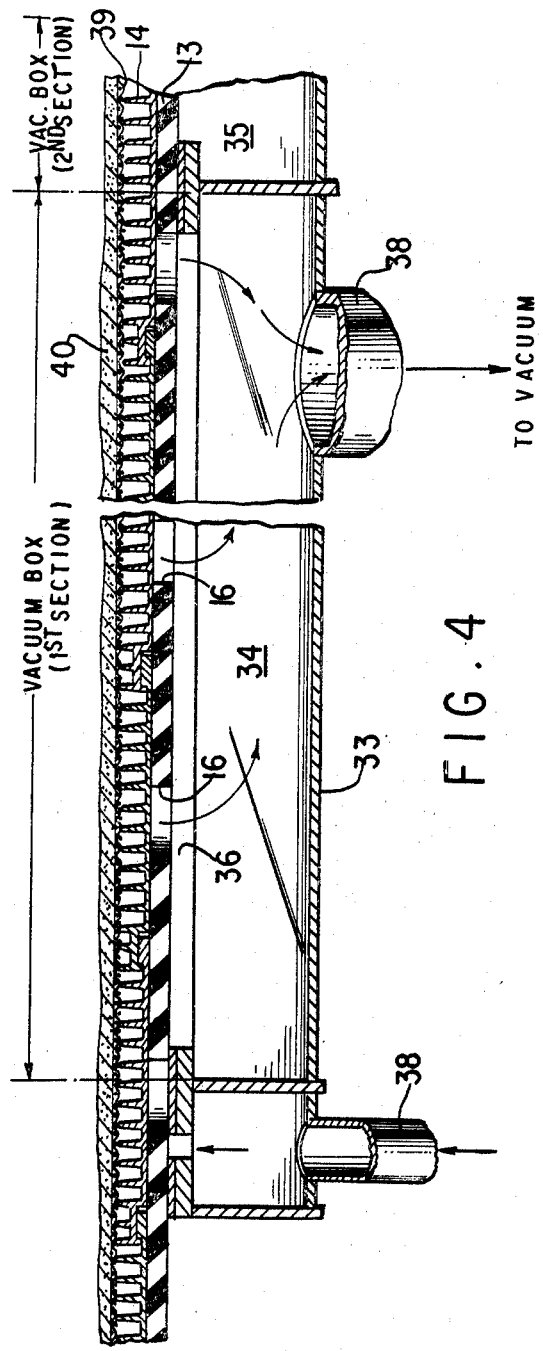

Nov. 11, 1969  J. E. KRYNSKI ET AL  3,477,583
HORIZONTAL TRAVELLING BELT FILTER
Filed July 21, 1967  4 Sheets-Sheet 4
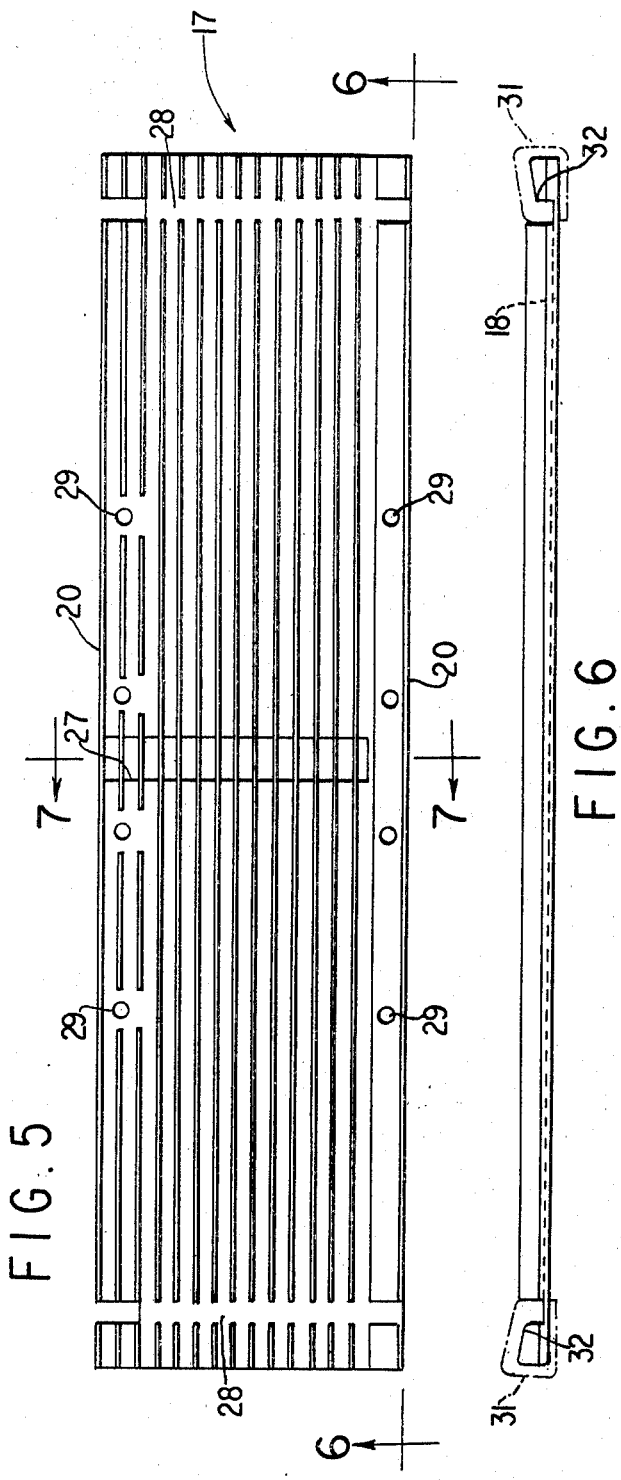
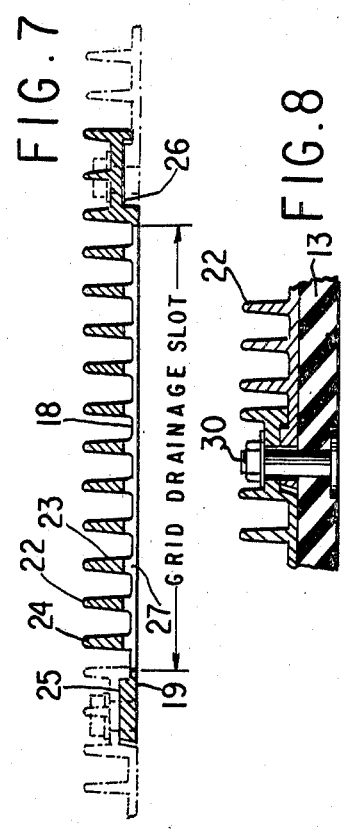
INVENTORS
JOHN E. KRYNSKI
RICHARD E. ENGWALL
BY
Smythe & Moore
ATTORNEYS United States Patent Office 3,477,583
Patented Nov. 11, 1969

3,477,583
HORIZONTAL TRAVELLING BELT FILTER
John E. Krynski and Richard E. Engwall, East Moline, Ill., assignors to Ametek, Inc., New York, N.Y., a corporation of Delaware
Filed July 21, 1967, Ser. No. 655,161
Int. Cl. B01d 33/04
U.S. Cl. 210—401                    7 Claims

ABSTRACT OF THE DISCLOSURE

A horizontal endless belt filter arrangement wherein the belt is composed of a plurality of interconnected grid elements, there being drainage slots in the tracking belt which communicate with slots in the grid elements.

---

The present invention relates to an endless belt filter machine and more particularly to a filter belt assembly for such a filter machine wherein the belt comprises a plurality of interconnected grid sections mounted upon a flexible belt.

An endless belt filter machine, such as disclosed in the present invention, essentially comprises a frame having a pair of spaced drums mounted thereon with an endless filter or drainage belt mounted on the drums. The belt usually has structure thereon so as to define a grid whereupon the belt functions as a drainage belt. An endless filter medium is then positioned on top of the drainage belt. Such drainage belts are generally of unitary or one-piece construction or fabricated from a number of pieces secured together into a single unitary member. The structure of such drainage belts may be complex in order that the belt performs properly the functions of draining the filtrate while at the same time confining the filtrate within the boundaries of the belt. Thus, in the event that portion of the belt becomes damaged or worn so as not to function properly, it is necessary to replace the entire belt. Furthermore, since the belt is made in one piece and is usually quite large, the cost of fabricating such a belt adds considerably to the costs of the filtering operation.

An object of the present invention is to provide an improved drainage belt assembly for an endless belt filter device.

Another object of the invention is to provide a drainage belt made of a plurality of grid members which may be interconnected to form a continuous grid surface.

In one aspect of the invention, there is provided a drainage belt assembly which essentially comprises an endless flexible tracking belt with a plurality of interconnected drainage grid members mounted on the outer surface of the tracking belt. An arrangement of drainage slots is provided in the tracking belt with the drainage slots communicating with drainage slots provided in the grid members. The grid members each have a plurality of uniformly spaced transverse ribs on the top surfaces thereof to define a plurality of transverse grooves. The transverse end of one grid member overlaps the adjacent transverse end of the next grid member, and detachable means fasten the overlapping ends of the grid members to the flexible tracking belt. The edges of the drainage belt formed by the interconnected grid members are sealed by a pair of flexible U-shaped strips which are fitted over the edges of the grid members. In order to obtain tighter sealing of the edges of the drainage belt, longitudinal grooves are provided in the ribs adjacent the edges of the belt. Each U-shaped sealing strip is provided with an internal flange on its upper leg, the flange being closely received within its respective longitudinal groove. The flange extends to the top surface of the grid member and thus, in effect, the strip will act as an upturned edge to confine liquids to the drainage belt.

Other objects, advantages and features of the present invention will become apparent from the following specification and accompanying drawings, which are exemplary.

In the drawings:

FIG. 3 is a sectional view taken along line 3—3 of FIG. 1;

FIG. 4 is a sectional view taken along a vertical plane at the central longitudinal axis of the drainage belt assembly, showing only a portion of the drainage belt;

FIG. 5 is a top plan view of a grid element employed in the drainage belt according to the present invention;

FIG. 6 is an end elevational view of the grid element of FIG. 5;

FIG. 7 is a sectional view taken along line 7—7 of FIG. 5; and

FIG. 8 is a vertical sectional view showing the interconnection between adjacent grid members and the flexible tracking belt.

Figure 1:
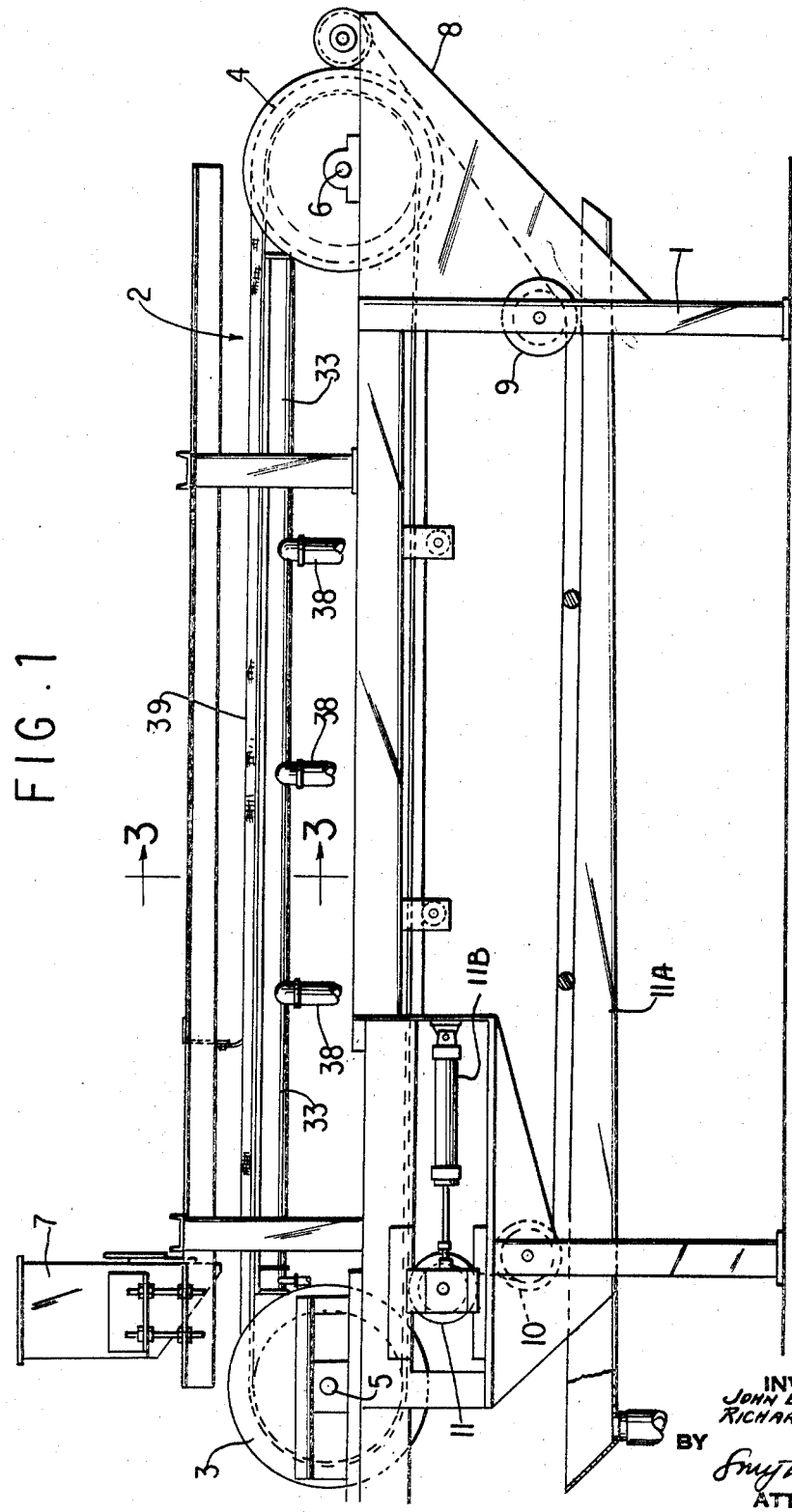
FIG. 1 is a side elevational view of an endless belt filter machine provided with the drainage belt of the present invention.
Figure 2:
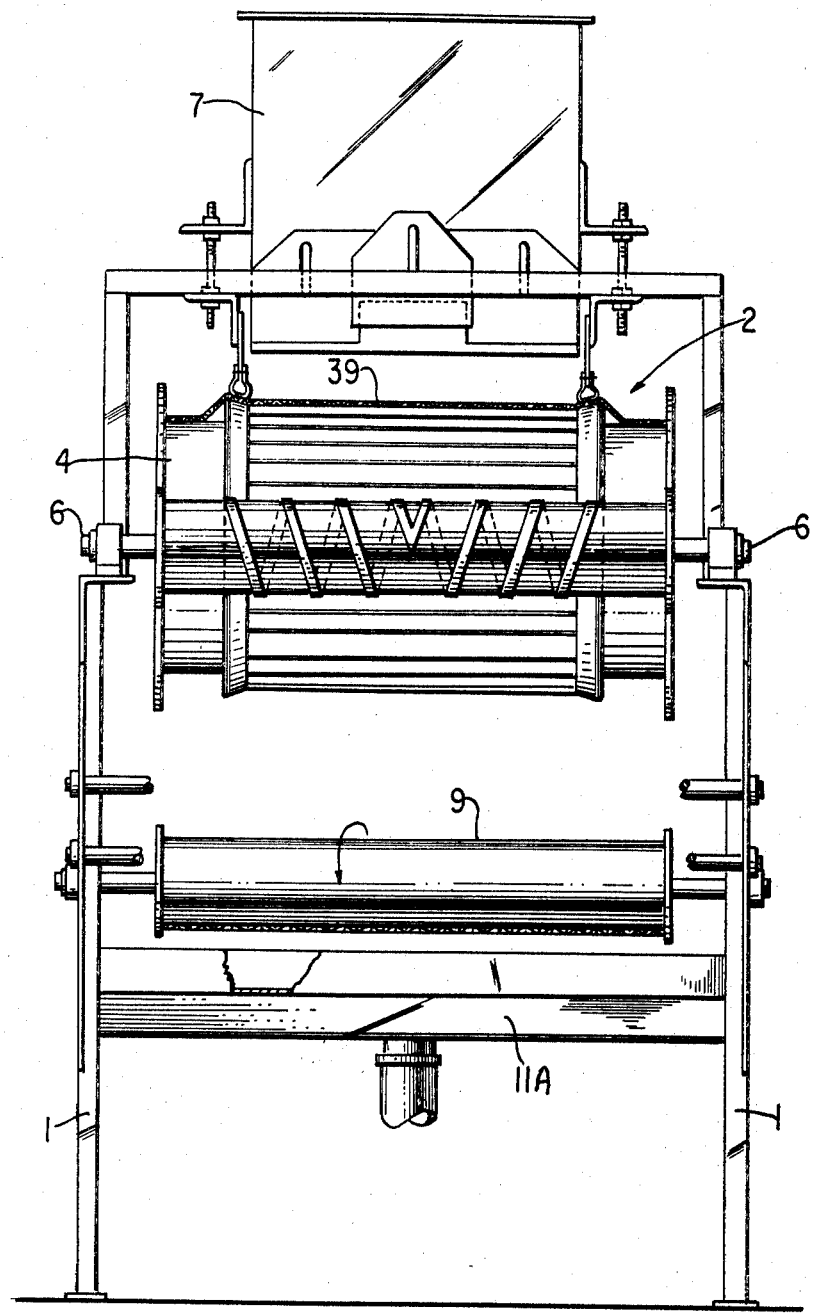
FIGURE 2 is an end elevational view, partly in section, of the filter device of FIG. 1.

Referring to the drawings wherein like reference symbols indicate the same parts throughout the various views, FIG. 1 illustrates the endless belt filter machine of the present invention. The filter machine comprises a main frame 1 and an endless filter assembly 2 supported on end drums 3 and 4 rotatably mounted in the frame on shafts 5 and 6. A feed hopper 7 is positioned above the feed end of the machine represented by drum 3 to discharge a slurry which is to be filtered upon the upper travelling portion of the filter belt assembly adjacent its feed end. The discharge end of the machine is at drum 4, and a hopper 8 is provided underneath the drum into which the filter cake is discharged.

The lower portion of the filter belt assembly travels over idler rollers 9, 10 and 11. Shaft 6 is driven by a suitable source of power. Idler 11 is a tensioning idler controlled by pneumatic cylinders 11B to maintain proper and even tension across the filter belt.

The lower portion of the endless filter belt between idler rollers 9, 10 and 11 travels over a pan 11A which collects wash water used to clean this portion of the filter belt and discharged upon the belt by spray assemblies or the like.

As may be seen in FIGS. 3 and 4, the filter belt assembly 2 comprises a tracking belt 13 and a drainage belt assembly 14. The tracking belt 13 is of the transmission type and may be made of rubber, leather or the like, and if desired, reinforced with fabric or steel wiring. The tracking belt 13 is relatively wide with respect to its width and has a plurality of longitudinally spaced drainage slots 15 along its central longitudinal axis, as shown in FIG. 3. Communicating with the longitudinal drainage slots 15 are a plurality of transverse drainage slots 16 which extend to the outer edges of the tracking belt.

The drainage belt assembly 14 is formed of a plurality of grid members indicated generally at 17 and illustrated in FIGS. 5 to 7. Each grid member comprises a flat body having a top surface 18 and a bottom surface 19. The ends of the grid member are indicated at 20 and 21.

Upstanding from the top surface 18 of each grid member is a plurality of uniformly spaced, transversely extending ribs 22 which extend across the entire width of the grid member. These transverse ribs 22 define a plurality of grooves 23. The walls of each rib taper slightly inwardly toward an apex 24 upon which a filter medium rests during the filtering operation.

The end 21 of the grid member is formed with a slightly raised portion 25 and there are no ribs upon this portion. Transverse end 20 of the grid member has an upwardly offset portion 26 shaped to conform to raised portion 25 of the next adjacent grid member to fit over portion 25 in overlapping relation, as illustrated in FIG. 7.

Along the central longitudinal axis of each grid member is a drainage slot 27.

Adjacent each edge of each grid member is a groove 28 formed in the transversely extending ribs. The groove extends downwardly to the top surface 18 of each grid member.

The grid members are interconnected to each other to form a continuous grid member. The ends of each grid member are provided with bolt openings 29, as may be seen in FIG. 5. When successive grid members are positioned in overlapping relation, bolts 30 are passed through the bolt openings 29 and through corresponding openings in the tracking belt 13, as shown in FIG. 8, to mount the grid members upon the tracking belt.

The grid members also are flexible and may be made of a suitable plastic material such as polypropylene.

When the grid members are mounted upon the tracking belt, the edges of the grid members are closed by positioning continuous U-shaped strips or clips 31 over the edges of the assembled grid members. The U-shaped clips each have an internal flange 32 extending from its upper leg, the internal flange 32 being positioned in the longitudinal groove 28 as shown in FIG. 6. Flange 32 engages the top surface 18 of the grid members so as to sealingly close the edges of the drainage belt assembly. Also, the strips 31 will act to upturn the edge portions of the filter medium during its upper travel to retain slurry deposited thereon.

A suction box 33 is mounted in the frame under the upper travelling portion of the filter belt assembly and has a triangular cross section, as may be seen in FIG. 3, and a plurality of longitudinally aligned compartments 34 and 35, each having a longitudinal slot 36 in the top wall 37 thereof for communication with the drainage slots in the tracking belt 13. Connections 38 may be used to provide liquid to the belt seal surface for lubrication thereof.

In the operation of the filter machine of the present invention, an endless filter medium 39 is positioned upon the grids of the grid elements. The filter medium may comprise a foraminous wire of metal, cloth, plastic composition, or the like.

The slurry to be filtered is then deposited upon the filter medium as indicated at 40. As the slurry is conveyed on the moving filter belt assembly, filtrate will be drawn from the slurry under the action of the suction and because of the movement of the belt. The filtrate is drawn into the suction box for discharge through the filtrate drains 38. As the slurry reaches the end of its horizontal path at the drum 4, the filtrate has been removed and the slurry is in cake form. The filter cake is then discharged from the end of the drum 4 into the hopper 8. Means may also be provided for freeing or loosening the filter cake from the filter medium just prior to its arrival at the discharge drum 4.

The suction box is compartmented with a separate suction connection to each compartment so as to make it possible to vary and control the suction applied to the filter cake as it progresses from the feed to the discharge end of the filter assembly. The use of smaller compartments adjacent the discharge end makes it possible to more accurately control the degree of suction in this area. It is desirable that no break in vacuum should occur as the filter belt assembly travels over the suction box from one compartment to another.

The use of a sectionalized drainage belt formed of a plurality of grid members greatly facilitates the maintenance of the drainage belt assembly. Should any damage, destruction or excessive wear occur to a portion of the drainage belt assembly, the affected grid member or members can be readily removed from the tracking belt and replaced. The series of uninterrupted grids provided by the interconnected grid members results in better flexing of the drainage belt. The extruded endless rubber U-shaped strips finishing the edges of the drainage belt serve as an efficient edge seal.

Thus, it can be seen that the present invention has provided an improved drainage belt assembly wherein a plurality of interconnected grid members results in more effective draining and filtering and also facilitates maintenance of the filter assembly.

What is claimed is:

1. In a drainage belt assembly for a horizontal belt filter machine, the combination including an endless flexible belt which is relatively wide with respect to its thickness and having outer and inner surfaces, there being a plurality of drainage slots in said belt, a plurality of interconnected flexible drainage grid members each having a top surface mounted on the outer surface of said belt, a transverse end of one grid member continuously overlapping the adjacent transverse end of the next grid member to define a continuous uninterrupted grid member, means on said grid members defining a plurality of uniformly spaced transverse grooves on the top surface of said grid members and extending across the width thereof, there being drainage openings in said grid members communicating with said belt drainage slots, detachable means fastening the overlapping ends of said grid members to each other and to said belt, and a pair of flexible U-shaped strips over the edges of said grid members to close said edges.

2. In a drainage belt assembly as claimed in claim 1 wherein there are a plurality of said drainage slots spaced longitudinally along the central axis of said belt, there also being a plurality of transverse drainage slots in said belt communicating with said longitudinal slots.

3. In a drainage belt assembly as claimed in claim 1 wherein said groove defining means comprises a plurality of transversely extending ribs upstanding from the top surface of said grid members, the portions of said grid member top surfaces between said ribs being flat.

4. In a drainage belt assembly as claimed in claim 3 wherein there are longitudinally extending grooves in said ribs adjacent the edges of said grid members, each U-shaped strip having an internal flange on the end of one of its legs with said strip flanges being received in said grooves.

5. In a drainage belt assembly as claimed in claim 4 wherein said U-shaped strip flanges extend to the top surfaces of said grid members to seal the edges of the drainage belt.

6. In a drainage belt assembly as claimed in claim 1 wherein each grid member has first and second transverse ends, said first transverse end comprising a flat uninterrupted portion raised above the top surface of the grid member, said second transverse end being offset upwardly to fit over the first transverse end of the next adjacent grid member.

7. In a drainage belt assembly as claimed in claim 1 wherein there are pneumatic cloth belt tensioning means connected to said belt.

References Cited

UNITED STATES PATENTS 1,862,050   6/1932   Donaldson    210—400
3,190,451   6/1965   Holland    210—406

REUBEN FRIEDMAN, Primary Examiner

T. A. GRANGER, Assistant Examiner